May 2, 1933.  M. F. CARR  1,906,445
SEPARABLE FASTENING MEMBER AND INSTALLATION THEREOF
Filed Nov. 7, 1930
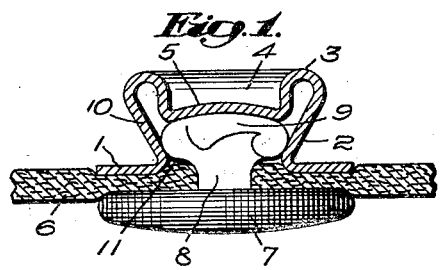
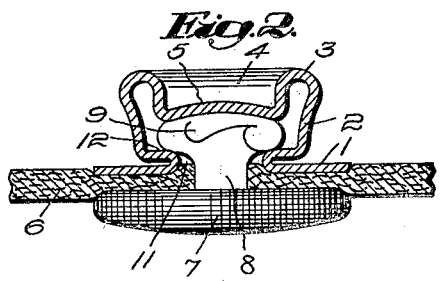
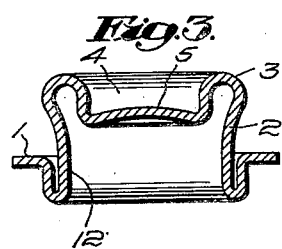
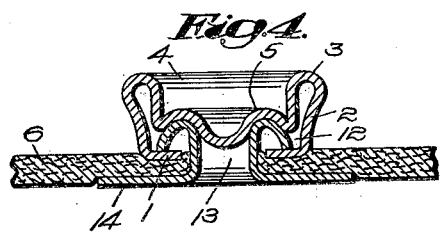
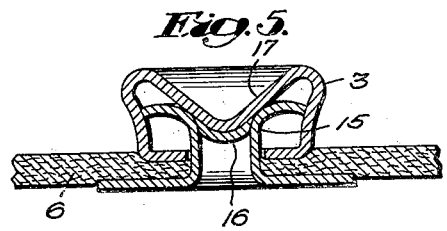
Inventor:
Moses F. Carr.
by Emery, Booth, Varney & Townsend
Attys Patented May 2, 1933

1,906,445

UNITED STATES PATENT OFFICE

MOSES F. CARR, OF LEXINGTON, MASSACHUSETTS, ASSIGNOR TO UNITED-CARR FASTENER CORPORATION, OF CAMBRIDGE, MASSACHUSETTS, A CORPORATION OF MASSACHUSETTS

SEPARABLE FASTENING MEMBER AND INSTALLATION THEREOF

Application filed November 7, 1930. Serial No. 494,023.

My invention aims to provide improvements in seperable fastening members and installations thereof.

Referring to the drawing which illustrates my invention:—

Figure 1 is a section through a snap fastener stud installation showing one form in which the stud may be made to provide for an improved attachment of the stud;

Fig. 2 is a section through a snap fastener stud showing the same general type of attachment but a different form for the stud;

Fig. 3 shows the form of the stud member shown in Fig. 2 as an intermediate stage of manufacture;

Fig. 4 is a section of a stud installation showing a hollow rivet instead of a tack and a different stud formation; and Fig. 5 is a section through a stud installation showing the use of a hollow tack as compared with the solid tack and tubular rivet used in the other installations.

Referring to the drawing which illustrates my invention I have shown stud members of separable snap fasteners which are simple in construction, durable and have novel features particularly, though not exclusively, adapted to secure stud members, of the type shown, to a carrying medium, in combination with a tack or hollow rivet.

The broad idea of my invention is to provide a fastener member which is formed from a single piece of metal and which has an anvil portion and a wall or shoulder cooperating with the anvil to provide means of attachment so that it is not necessary to assemble a clench plate or the like with the fastener part as has been the usual practice heretofore.

In Figure 1 I have shown a snap fastener stud formed from a single piece of sheet metal and having a base 1, a neck 2, flaring outwardly at a substantially greater angle than has been the usual practice heretofore, and a head 3. The central portion of the head 3 is depressed to provide a cup-shaped portion 4, the bottom of which is curved to provide an anvil portion 5.

Any suitable means may be used to attach the stud to the carrying medium 6, but I have preferred to use a tack 7 having a sharp pointed shank 8 adapted to pierce the carrying medium 6. It is to be understood that the parts are located in a suitable setting mechanism and, therefore, the anvil portion 5 will be back-supported to prevent its being pierced by the shank 8 of the tack. During the attaching operation the shank of the tack is upset and spread laterally by the anvil portion 5 so that the upset portion 9 will engage the wall 10 presented by the neck 2. Since the upset portion 9 engages the wall 10 and the anvil portion 5 and is larger in diameter than the aperture 11 through the base 1 of the stud, a strong, durable attachment is provided and all of the means for cooperation with the upset portion 9 of the tack is formed as integral parts of the stud member.

Referring now to the embodiment of my invention illustrated in Figs. 2 and 3, I have shown a stud member attached in the same general manner as described in connection with Figure 1. However, the stud is formed in a different manner, so that there may be a greater area presented for engagement between the upset portion 9 of the tack 7 and the wall or shoulder presented by the stud. In this instance, I prefer to call the engaging surface an annular shoulder 12 (Fig. 2) formed by a wall extending directly inwardly from the neck 2 and being substantially parallel to the base 1 which extends from the inner edge of the wall providing the shoulder 12.

One manner in which the shoulder 12 may be formed is shown by the double wall portion (Fig. 3) formed during an intermediate stage of the manufacture of the stud and finally bent inwardly so that it takes the shape shown in Fig. 2. By using a structure as shown in Figs. 2 and 3 the conventional type of stud may be provided and the at-
tachment is to some extent more durable than that shown in Figure 1.

In Fig. 4 I have shown a stud installation in which the stud is simplified over that shown in Fig. 2, because the outwardly extending base is eliminated and the inwardly turned wall providing the shoulder 12 also provides the base 1. Furthermore, the bottom of the cup-shaped portion 4 is formed to a different shape to provide a double curved surface suitable for upsetting the hollow shank 13 of the rivet 14 used instead of a tack. Therefore, I have illustrated the fact that my invention is not limited to exact details or to any particular parts.

In Fig. 5 I have shown a snap fastener stud secured in position upon a flexible carrying medium by means of a hollow tack 15 which has a pointed portion 16 adapted to penetrate the carrying medium and engage the anvil portion 17 in the head of the stud. In this case the pointed portion 16 is severed from the end of the tack by the anvil portion and the shank then takes the form of a tubular rivet which has its end upset, as shown by Fig. 5. As the end of the shank is spread the severed end 16 is forced into the hollow shank as shown and acts as a wedge to hold the expanded portion and thereby strengthen the installation.

While I have shown and described preferred embodiments of my invention, I do not wish to be limited thereto, because the scope of my invention is best defined by the following claims.

I claim:

1. A separable snap fastener installation comprising, in combination a snap fastener member, a carrying medium and an attaching member, said snap fastener member having a head for fastening engagement with another snap fastener member, a central depressed portion in said head having an annular wall and a bottom, said bottom being spaced from the top of said head and being curved in cross section in a direction extending from said annular wall upwardly toward said head to provide anvil means, said attaching member having a shank passing through the carrying medium and having its end upset and spread laterally by said anvil means, and said fastener member having an integral wall spaced from said head and located adjacent to the anvil means whereby the laterally spread portion of said shank engages said integral wall to fasten the parts of the installation together.

2. A separable snap fastener installation comprising, in combination, a snap fastener member, a carrying medium and an attaching member, said snap fastener member being formed from a single piece of metal and having a head for fastening engagement with another snap fastener member, a central depressed portion in said head having an annular wall and a bottom, said bottom being spaced from the top of said head and being curved in cross section in a direction extending from said annular wall upwardly toward said head to provide anvil means, said attaching member having a shank passing through the carrying medium and having its end upset and spread laterally by said anvil means, and said fastener member having an integral wall portion adjacent to the carrying medium against which the laterally spread portion of said shank is engaged thereby to fasten the parts of the installation together.

3. A separable snap fastener installation comprising, in combination, a snap fastener member, a carrying medium and an attaching member, said snap fastener member having a head for fastening engagement with another snap fastener member, a central depressed portion in said head having anvil means spaced from the top of said head, said attaching member having a sharp pointed shank passing through the carrying medium and having its end upset and spread laterally by said anvil means and said fastener member having an integral wall adjacent to the carrying medium against which the laterally spread portion of said shank is engaged thereby to fasten the parts of the installation together.

4. A fastener member formed from a single piece of metal and having a stud head, a neck, a cup-shaped portion pressed from said head and the bottom of said cup-shaped portion being curved in cross-section in a direction upwardly toward said head beginning adjacent to the wall of the cup-shaped portion to provide anvil means spaced a substantial distance from the top of said head for upsetting an attaching member and an annular shoulder extending abruptly inwardly from said neck adjacent to the bottom of said fastener and cooperating with the anvil portion to provide for attachment of the fastener to a support.

5. A separable snap fastener member formed from a single piece of metal and having a stud head, a neck, a central depressed portion in said head having anvil means spaced from the top of said head for upsetting an attaching member and a wall extending inwardly at substantially a right angle from said neck to provide an annular shoulder for cooperation with the anvil means to provide for attachment of the fastener to a support.

6. A fastener member formed from a single piece of metal and having a stud head, a neck, a cup-shaped portion pressed from said neck and the bottom of said cup-shaped head portion being curved in cross-section to provide anvil means spaced a substantial distance from the top of said head for upsetting an attaching member, an annular shoulder extending inwardly from said neck and cooperating with the anvil portion to provide for attachment of the fastener to a support and a base extending outwardly from the inner edge of the annular shoulder, said annular shoulder being parallel with said base so as to underlie in spaced relation thereto a portion of said anvil means.

In testimony whereof, I have signed my name to this specification.

MOSES F. CARR.